United States Patent Office 3,600,421
Patented Aug. 17, 1971

3,600,421
POLYHALOFORMATES
Thomas K. Brotherton, John W. Lynn, and John Smith, Jr., Charleston, W. Va., assignors to Union Carbide Corporation
No Drawing. Filed June 26, 1967, Ser. No. 648,963
Int. Cl. C07c 69/00
U.S. Cl. 260—463                                    7 Claims

ABSTRACT OF THE DISCLOSURE

Alkylene oxides and/or epsilon-caprolactone are reacted with nucleus polyol compounds comprising sorbitol 1,2,6-hexanetriol, trimethylolpropane, trimethylolethane 1,1,5,5-tetrakis(4 - hydroxyphenyl)pentane, pentaerythritol and pyrogallol in a ratio of about 1 to 100 moles per mole of the nucleus polyol to form a poly-hydroxy compound.

---

The polyhydroxy compound in turn is reacted with a carbonyl dihalide such as phosgene to form polyhaloformates. Since the hydroxyl groups of the poly-hydroxy compound are found to have substantially equal reactivity quantitative yields of the polyhaloformate are obtained and the formation of cyclic carbonates is either eliminated or substantially avoided. The polyhaloformates may be used to form polymers.

This invention, in general, relates to novel polyhaloformate adducts, and more particularly to novel higher polychloroformate adducts, containing at least 3 chloroformate groups.

Although the various mono- and di-chloroformates are known in the art as reaction intermediates obtained by the reaction of phosgene with mono- and di-hydroxy-containing materials, the formation of higher polychloroformates, such as tri-, tetra-, penta-, hexa-, chloroformates, and the like from phosgene and higher polyhydroxy-containing materials has not heretofore been extensively investigated.

The preparation of higher polychloroformates by the reaction of phosgene with higher polyols or polyhydroxy-containing materials is beset with many problems, such as the formation of by-product cyclic carbonates and incomplete reaction of all of the available hydroxyl groups of such polyols. The quantitative formation of polychloroformates has been hindered by higher polyhydroxy-containing materials which possess hydroxyl groups adjacent to a haloformate since the haloformate may react with the hydroxyl to form a cyclic carbonate as follows:

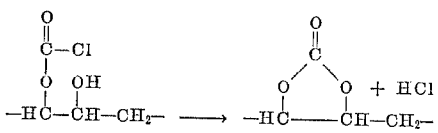

Additionally, the presence of hydroxyl groups of unequal reactivity (primary, secondary, etc.) will in some instances result in the formation of haloformates and unreacted hydroxyl groups due to the different rates of reaction of the various hydroxyl moieties in the polyols chain.

Accordingly, it is an object of the present invention to avoid these and other difficulties encountered in the prior art and to provide new and useful polyhaloformates that are derived substantially quantitatively from phosgene and a polyol.

It is another object of the present invention to provide novel higher polyhaloformate adducts, e.g. tri-, tetra-, penta-, hexahaloformates and the like especially polychloroformates. It is a further object to provide novel polyhaloformates preferably polychloroformates which are useful as reaction intermediates for the preparation of a great variety of resin systems. It is still a further object of the present invention to provide novel polyhaloformate adducts of a carbonyl dihalide and a polyhydroxy-containing material. A further object is to provide novel polyhaloformates prepared by phosgenating the polyhydroxy condensate obtained by the condensation reaction of a polyol with a cyclic ether. Another object of the present invention is to provide novel polychloroformate adducts prepared from the poly-hydroxy-condensate of a polyol with an alkylene oxide or an epsilon-caprolactone.

These and other objects have been achieved by the present invention by which it has been found that the quantitative formation of polychloroformates is favored by a special class of polyols, the hydroxyl groups of which are sufficiently separated and are of equal reactivity.

The polyols used in this respect comprise the reaction of a "nucleus polyol" with caprolactone, ethylene oxide or propylene oxide. An example of such polyols comprises the reaction of sorbitol as a "nucleus polyol" with ethylene oxide in stoichiometric or greater amounts.

The novel polyhaloformate adducts of this invention can readily and easily be prepared in quantitative yields and high purity. Infrared analysis of the elemental condensation products obtained according to the process of this invention indicates the complete absence of any unreacted hydroxyl groups and, at most, only trace amounts of by-product cyclic carbonates. The polyhaloformates of this invention can be isolated by common techniques known in the art.

The following polyhydroxy compounds are reacted with alkylene oxides to obtain the polyols reacted according to this invention: sorbitol, 1,2,6-hexanetriol, trimethylolpropane, trimethylolethane, 1,1,5,5 - tetrakis(4 - hydroxy-phenyl)pentane, pentaerythritol, pyrogallol.

Representative lower alkylene oxides which can be reacted with the aforementioned hydroxy-containing materials in order to prepare the polyols comprise ethylene oxide, propylene oxide and epsilon-caprolactone, telomers, mixed telomers, and polymers in a ratio of about 1 to about 100 moles of alkylene oxide per mole polyhydroxy compound. Any combination of alkylene oxides and polyhydroxy compounds may be condensed using the aforementioned ratios to form the polyols reacted according to this invention.

Examples of polyols used in this invention comprise the condensation products of the following polyhydroxy compounds and alkylene oxides in a ratio from about 1 to 96: 1 to 48 preferably about 1 to 48: 1 to 64 and especially about 1 to 48: 1 to 48 moles respectively: sorbitol+ethylene oxide; 1,2,6 - hexanetriol+ethylene oxide, trimethylolpropane+ethylene oxide; 1,1,5,5-tetrakis (4 - hydroxyphenyl)pentane+ethylene oxide; sorbitol+ε - caprolactone; 1,2,6 - hexanetriol+ε-caprolactone; tripentaerythritol+ε - caprolactone; dipentaerythritol+ε-caprolactone; trimethylolethane+propylene oxide; pyrogallol+propylene oxide; pentaerythritol+propylene oxide; 1,2,6-hexanetriol+propylene oxide.

The polyhaloformates of this invention, due to their multi-functionality, offer extensive intermediate applications. From the reaction of the polyhaloformates of this invention with multiple amino-, hydroxy-, thiol- and epoxy-containing substances, a great variety of new resin systems can be "tailor-made" for specific applications. The unsaturated polyhaloformate derivatives can be converted into multi-epoxides and/or used as vinyl monomers. These latter materials can then be used in plasticizer systems, or polymerized to furnish new types of vinyl resins, respectively. The carbamate and carbonate polychloroformate derivatives may find utility in the biological field, since carbamates and carbonates often exhibit biological activity.

As used herein, the term "polyhaloformate" includes polyhalocompounds wherein the "formate" portion is either a

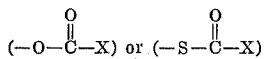

group wherein X is F, Cl or Br. "Cyclic ether" refers to either cyclic oxyethers or cyclic thioethers, and is meant to specifically include compounds such as the lactones and their sulfur analogues.

In general, the novel polyhaloformate adducts of this invention can be represented by Formula I:

(I) 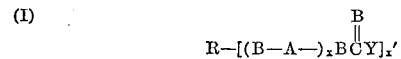

wherein R represents a polyfunctional radical such as alkylene, alkylene oxide, polyalkylene oxide, arylene, alkarylene, arylalkylene, alkenyl, arylalkenyl, alkenylaryl, alkynyl, aryl alkynyl, alkynylaryl, heterocyclyl, heterocyclylalkenyl, alkenylheterocyclyl, alkynylheterocyclyl, heterocyclylalkynyl, arylheterocyclyl, heterocyclaryl, and the like the radicals alkyl, aryl and alkaryl having from 1 to 30 carbon atoms being preferred and preferably the lower alkyl, alkylene, alkylene oxide and polyalkylene oxide radicals are employed, i.e., those having from 1–5 carbon atoms. The cyclic groups in this regard preferably comprise phenyl or naphthyl radicals. A represents any of the radicals or groups described by R preferably a lower alkylene and may be the same as R or may be different; B represents an oxygen or sulfur atom, oxygen being preferred; Y represents a halogen, either fluorine, chlorine, or bromine-chlorine being preferred; $x$ and $x'$ are integers which may be the same or different and have a value from 1–10, especially where $x=1$ to 5 and $x'=3$ to 6, but preferably $x'=3$. Preferred embodiments are polyhaloformates of the formula

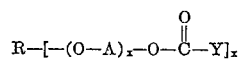

wherein R is an aliphatic hydrocarbon radical containing 1 to 6 carbon atoms and A is lower alkylene.

Any of the above radicals or groups may be linked to or contain various other radicals or groups such as, e.g., ether, epoxide, sulfide, polysulfide, sulfoxide, sulfone, sulfonic acid, sulfonate ester, sulfonamide, ketone, aldehyde, acetal, carboxylic acid, carboxylic ester, carboxamide, nitro, nitrile, nitroso, amino, urea, urethane, carbonate, silane, inorganic ester, inorganic ether, inorganic amide, various metals, and the like.

Representative multi-haloformates encompassed within Formula I include, for example, sorbitol-ethylene oxide hexol hexachloroformate; sorbitol-ethylene oxide hexol hexabromoformate; sorbitol-ethylene oxide hexol hexafluoroformate; 1,2,6-hexanetriolethylene oxide triol tribromoformate; 1,2,6-hexanetriolethylene oxide triol trichloroformate; trimethylolpropane-ethylene oxide triol trichloroformate; 1,1,5,5 - tetrakis(4 - hydroxyphenyl)pentane-ethylene oxide tetraol tetrachloroformate; sorbitol-epsilon-caprolactone hexol hexachloroformate; 1,2,6-hexanetriol-epsilon-caprolactone triol trichloroformate; tripentaerythritol - epsilon - caprolactone octol octachloroformate; dipentaerythritol - epsilon - caprolactone hexol hexachloroformate; trimethylolethane - propylene oxide triol trichloroformate; pyrogallol - propylene oxide triol trichloroformate; pentaerythritol - propylene oxide tetrol tetrachloroformate; 1,2,6 - hexanetriol - propylene oxide triol trichloroformate; glycerol-ethylene oxide triol trichloroformate; mannitol-ethylene oxide hexol hexachloroformate; erythritol-ethylene oxide tetrol tetrachloroformate; pentaerythritol - ethylene oxide tetrol tetrachloroformate; sorbitol ethylene oxide hexol hexachloroformate; arabitol-ethylene oxide pentol pentachloroformate; dulcitol-ethylene oxide hexol hexachloroformate;

With reference to Formula I, for illustrative purposes only, the formulae of typical multi-chloroformates are as follows:

(A) The hexachloroformate derived from sorbitol-ethylene oxide hexol:

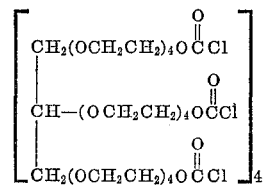

wherein R=CH$_2$—

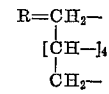

B is oxygen, A is —CH$_2$—CH$_2$—, Y is Cl, $x$ is 4 and $x'$ is 6.

(B) The octachloroformate derived from tripentaerythritol-caprolactone octanol:

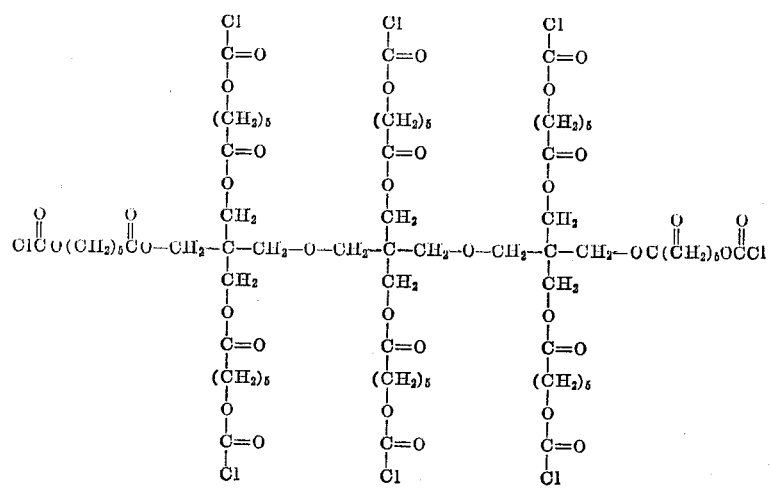

wherein R is

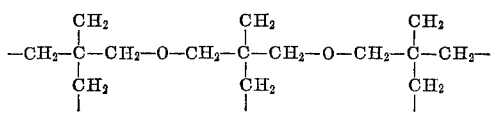

B is oxygen, A is

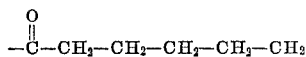

Y is Cl, $x$ is 1 and $x'$ is 8.

The multi-haloformates of this invention can be prepared by reacting a carbonyl dihalide with a hydroxy-containing material, e.g., polyol. The operable polyols contain alcoholic hydroxyl and/or phenolic hydroxyl groups.

In its broadest concept the process of this invention includes the utilization of any carbonyl dihalide such as carbonyl chloride fluoride, and carbonyl dibromide as well as carbonyl dichloride (phosgene). However, for economic considerations phosgene is the preferred carbonyl halide.

In general, the process of this invention involving the reaction of a polyol with a carbonyl dihalide, e.g., phosgene, is conducted by sparging gaseous phosgene through an inert-normally liquid reaction medium, i.e., organic solvent containing the desired polyol. The resulting solution is sparged with air to remove by-product hydrogen chloride and unreacted phosgene and the solvent is then removed under reduced pressure leaving the multi-chloroformate as residual product. The multi-chloroformate can then be recovered by methods well known in the art. Phosgene is employed in the description of the process of the invention for illustrative purposes only and the process is deemed applicable for other carbonyl dihalides. Also the carbonyl dihalide, e.g., phosgene can be used in either the gaseous or liquid form.

The temperature at which the multi-haloformate is obtained ranges from about −10 to about 80°; preferably about 10 to about 60 especially about 25 to about 50° C.

The pressure of the process of this invention is not critical and the process can be conducted at atmospheric, subatmospheric or superatmospheric pressures, or pressures ranging from about 5 mm. to 3 atm.

In practice it has been found that the mol ratio of phosgene to polyol in the initial reaction medium preferably should be in excess of 2 to 1 respectively although satisfactory results have been obtained at a lower ratio. When phosgene subsequently is sparged into the reaction medium containing the polyol and the solvent, feed rates of up to about 30 mols of phosgene per mol of polyol per hour are preferred, especially 1:20 moles of phosgene per mol of polyol per hour.

Inasmuch as the yield and rate of formation of the multi-haloformates are dependent upon several variables; e.g., concentration of the polyol, solubility of the polyol in the solvent, temperature and rate of phosgene addition, no hard and fast rule can be derived regarding the optimum conditions to be employed.

Representative inert-normally liquid reaction media; i.e., organic solvents which can be used in the process of this invention are: dimethyl ether, methyl ethyl ether, diethyl ether, di-n-propyl ether, diisopropyl ether, methyl n-butyl ether, ethyl n-butyl ether, di-n-butyl ether, di-n-amyl ether, di-isoamyl ether, di-n-hexyl ether, ethylene glycol dimethyl ether, dicyclohexyl ether, methyl cyclohexyl ether, ethyl cyclohexyl ether, anisole; the aliphatic, cycloaliphatic and aromatic esters including mixtures thereof, such as, methyl formate, ethyl formate, diethyl carbonate, methyl acetate, ethyl acetate, n-propyl acetate, n-butyl acetate, isobutyl acetate, t-butyl aceate, methyl propionate, ethyl propionate, methyl n-butyrate, ethyl n-butyrate, methyl n-valerate, methyl isovalerate, methyl cyclohexylcarboxylate, ethyl cyclohexylcarboxylate, methyl benzoate, ethyl benzoate; aliphatic ketones, such as acetone, methyl ethyl ketone, methyl n-propyl ketone, diethyl ketone, methyl t-butyl ketone, diisopropyl ketone; aliphatic and cycloaliphatic and the like; halogenated aliphatic hydrocarbons such as, carbon tetrachloride, chloroform, perchloroethylene and the like.

Preferred solvents include ethyl formate, ethyl acetate, ethyl propionate, ethyl carbonate, diethyl acetal, diethyl ether, dibutyl ether, acetone, methyl ethyl ketone, carbon tetrachloride, chloroform, tetrahydrofuran, anisole, benzene, toluene and xylene. The particularly preferred co-solvents include diethyl ether, dibutyl ether, ethyl acetate, and tetrahydrofuran. The most preferred solvent is tetrahydrofuran.

Those compounds chosen to supply the functional moiety XR' in Formulae II and III are added to the haloformate compounds of this invention incrementally to provide polymers. Non-incremental addition of these XR' compounds to the haloformates will result in the formation of non-polymeric adducts.

This invention also includes novel multiple monomeric and polymeric derivatives of the aforementioned multi-haloformates, particularly the derivatives of the multi-carbonates and multi-carbamates (urethanes).

These derivatives can be represented by the monomeric formula:

(II) 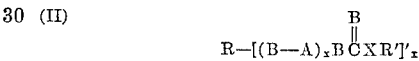

and the polymeric formula:

(III) $[Z_w(XR')_{x'}]_n$ wherein R, B, $x$, $x'$ and A are defined in Formula I above R'=R, X=B, NH or NR, $n$=a whole number (usually a large number from 6 to 250), W=functionality of R' (a whole number >1) and Z=R

The multiple carbamates and carbonates described herein can be prepared respectively, by the reaction of the multi-haloformates, e.g., chloroformates, with amine-containing and hydroxy-containing substances; e.g.,

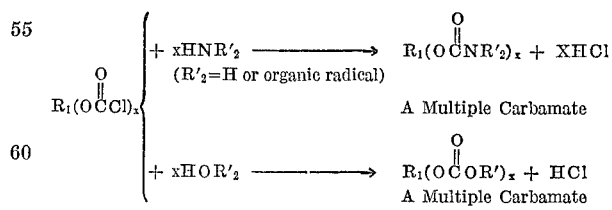

In the above equations, $R_2$ may be the same or different radicals. If the radicals represented by R' are the same then homo-multiple-carbamates and homo-multiple-carbonates will be realized. If the radicals represented by R' are different, then mixed multiple carbamates and mixed multiple carbonates will be realized.

A third type of analogous compound is the mixed multiple (carbamate-carbonate), which can be derived from multi-chloroformates by one of two procedures.

(1) A random multiple (carbamate-carbonate) from the reaction of multiple chloroformate with a stoichiometric mixture of amines and hydroxy-containing materials.

$$R_1(O\overset{O}{\overset{\|}{C}}Cl)_x + YR'_2OH + ZR'_2NH \longrightarrow R\begin{pmatrix}(O\overset{O}{\overset{\|}{C}}OR'_2)_y\\(O\overset{O}{\overset{\|}{C}}NR'_2)_z\end{pmatrix}$$

(2) An orderly arranged multiple (carbamate-carbonate) from the reaction of a multiple chloroformate with deficient quantity of either an amine or hydroxy-containing material and subsequent reaction of the remaining chloroformate groups with a stoichiometric quantity of either an amine or a hydroxy-containing substance.

$$R(O\overset{O}{\overset{\|}{C}}Cl)_x + YR'OH \xrightarrow{-YHCl}$$

$$R\begin{pmatrix}(O\overset{O}{\overset{\|}{C}}OR')_y\\(O\overset{O}{\overset{\|}{C}}Cl)_z\end{pmatrix} \xrightarrow[-ZHCl]{ZR'_2NH} R\begin{pmatrix}(O\overset{O}{\overset{\|}{C}}OR')_y\\(O\overset{O}{\overset{\|}{C}}NR'_2)_z\end{pmatrix}$$

or $$R(O\overset{O}{\overset{\|}{C}}Cl)_x + ZR'_2NH \xrightarrow{-ZHCl}$$

$$R\begin{pmatrix}(O\overset{O}{\overset{\|}{C}}NR'_2)_z\\(O\overset{O}{\overset{\|}{C}}Cl)_y\end{pmatrix} \xrightarrow[-YHCl]{YR'OH} R\begin{pmatrix}(O\overset{O}{\overset{\|}{C}}NR'_2)_z\\(O\overset{O}{\overset{\|}{C}}OR')_y\end{pmatrix}$$

Polymeric substances can be derived from multiple haloformates, e.g., chloroformates, and multiple amines and/or hydroxy-containing substances by any of the above general procedures.

The following equations summarize other methods for the preparation of the subject carbamates and carbonates in which multi-chloroformates are not employed.

(1) Multiple-carbamates using isocyanates $$R\text{---}(OH)_x + XR'NCO \longrightarrow R\text{---}(O\overset{O}{\overset{\|}{C}}NHR')_x$$

(2) Multiple carbamates using carbamoyl chlorides $$R\text{---}(OH)_x + XR'_2N\overset{O}{\overset{\|}{C}}Cl \longrightarrow R\text{---}(O\overset{O}{\overset{\|}{C}}NR'_2)_x + XCHl$$

(3) Multiple carbonates using chloroformates $$R\text{---}(OH)_x + R'O\overset{O}{\overset{\|}{C}}Cl \longrightarrow R\text{---}(O\overset{O}{\overset{\|}{C}}OR')_x + XCHl$$

Any of the reactions (1), (2) and (3) can also be used in series or combinations to prepare multiple (carbamates-carbonates) of the types previously described.

With reference to Formula II for illustrative purposes only, the following monomeric derivatives are typical of those encompassed thereby.

(C) The triscarbamate of glycerine-propylene oxide triol:

$$\begin{array}{l}CH_2(-OCH_2CH-)_2O\overset{O}{\overset{\|}{C}}NH_2\\ \quad\quad\quad\quad\quad\;\; |\\ \quad\quad\quad\quad\quad\;\; CH_3\\ |\\ CH(-OCH_2CH-)_2O\overset{O}{\overset{\|}{C}}NH_2\\ \quad\quad\quad\quad\;\; |\\ \quad\quad\quad\quad\;\; CH_3\\ |\\ CH_2(-OCH_2CH-)_2O\overset{O}{\overset{\|}{C}}NH_2\\ \quad\quad\quad\quad\quad\;\; |\\ \quad\quad\quad\quad\quad\;\; CH_3\end{array}$$

wherein:

$$R=\overset{|}{C}H_2-\overset{|}{C}H-\overset{|}{C}H_2$$

O=oxygen $$A=-CH_2-\overset{}{\underset{CH_3}{C}H-}$$

$x=2$
$x'=3$
$B=\text{---NH---}$
$R'=H$ (D) A mixed alkenyl carbamate-alkenyl carbonate of 1,2,6-hexane-ethylene oxide triol:

$$\begin{array}{l}CH_2-(OCH_2CH_2)_3O\overset{O}{\overset{\|}{C}}NHCH_2-CH=CH_2\\ |\\ CH-(OCH_2CH_2)_3O\overset{O}{\overset{\|}{C}}OCH_2-CH=CH_2\\ |\\ (CH_2)_3\\ |\\ CH_2-(OCH_2CH_2)_3O\overset{O}{\overset{\|}{C}}OCH_2-CH=CH_2\end{array}$$

wherein $$R=\overset{|}{C}H_2-\overset{|}{C}H-(CH_2)_3-\overset{|}{C}H_2$$

O=oxygen
$A=\text{---}CH_2CH_2\text{---}$
$x=3$
$x'=3$
$B=\text{---NH---}$ and $\text{---O---}$
$R'=\text{---}CH_2\text{---}CH=CH_2$ (E) A triepoxyhexacarbonate $$\begin{array}{l}O\overset{O}{\overset{\|}{C}}OCH_2CH_2O\overset{O}{\overset{\|}{C}}OCH_2-CH\overset{O}{\underset{\diagdown}{-}}CH_2\\ O\overset{O}{\overset{\|}{C}}OCH_2CH_2O\overset{O}{\overset{\|}{C}}OCH_2-CH\overset{O}{\underset{\diagdown}{-}}CH_2\\ -O\overset{O}{\overset{\|}{C}}OCH_2CH_2O\overset{O}{\overset{\|}{C}}OCH_2-CH\overset{O}{\underset{\diagdown}{-}}CH_2\end{array}$$

wherein

R = (benzene ring with three substituents)

O=oxygen $$A=-\overset{O}{\overset{\|}{C}}-O-CH_2-CH-$$

$x=1$
$x'=3$
$B=O$ $$R'=CH_2-\overset{O}{\overset{\diagup\diagdown}{C}H}-CH_2$$

With reference to Formula III for illustrative purposes only, the following polymeric derivatives are typical of those encompassed thereby.

(F) A three-dimensional polycarbonate

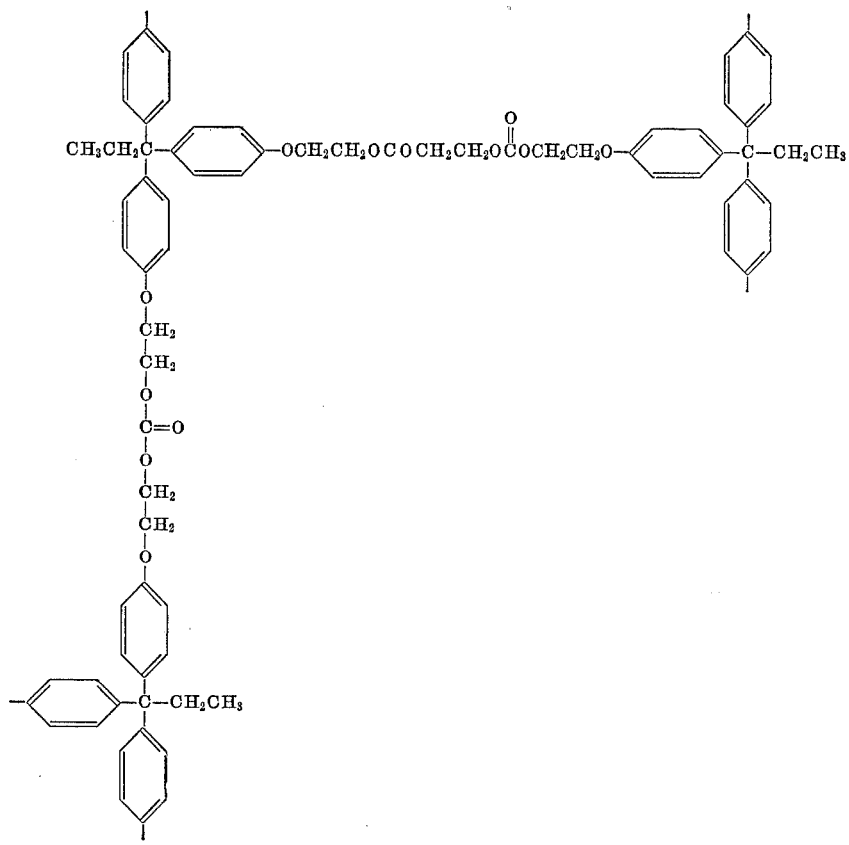
wherein
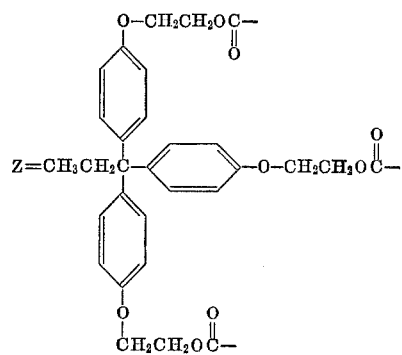
$x'=3$
$w=2$
$B=0$
$R'=\!-\!CH_2CH_2\!-$
(G) A three-dimensional polycarbamate (polyurethane)
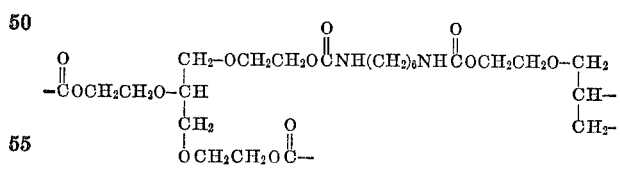
wherein
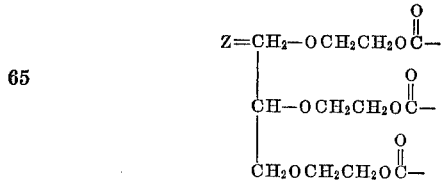
X=NH, R'=—(CH$_2$)$_6$—, $x'=2$, $n=1$ and $w$ is defined above.
The following non-limiting examples will more fully illustrate certain preferred embodiments of the invention.

TABLE.—MULTIPLE CHLOROFORMATES
$$R(OH)_x + X(COCl_2) \longrightarrow R(O\overset{\overset{O}{\|}}{C}-Cl)_x + X(\Theta Cl) \quad x=>2$$
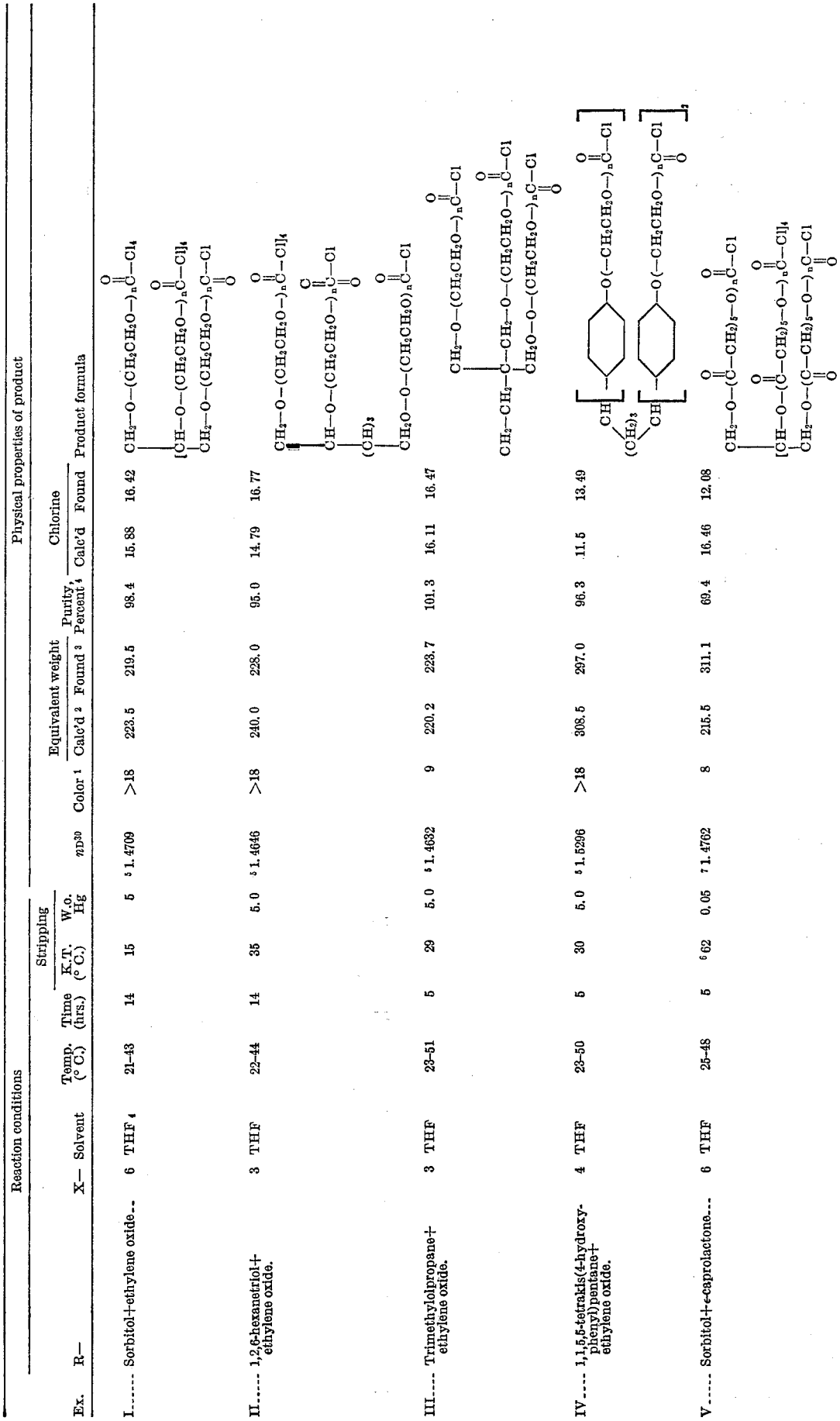

TABLE.—MULTIPLE CHLOROFORMATES—Continued

| Ex. | R— | X— | Reaction conditions | | | | Stripping | | | Color[1] | Equivalent weight | | Purity, Percent[3] | Chlorine | | Product formula |
| --- | --- | --- | --- | --- | --- | --- | --- | --- | --- | --- | --- | --- | --- | --- | --- | --- |
| | | | Solvent | Temp. (°C.) | Time (hrs.) | | K.T. (°C.) | W.o. Hg | $n_D^{30}$ | | Calc'd[2] | Found[3] | | Calc'd | Found | |
| VI | 1,2,6-hexanetriol+ε-caprolactone | 3 | THF | 24-62 | 5 | | 31 | 5.0 | [8]1.4691 | 10 | [9]368.5 | 425.7 | 86.7 | 9.63 | 8.95 | $CH_2-(O-C-(CH_2)_5-O-)_n C-Cl$ <br> $CH-(O-C-(CH_2)_5-O-)_n C-Cl$ <br> $(CH_2)_3$ <br> $CH_2-(O-C-(CH_2)_5-O-)_n C-Cl$ |
| VII | Tripentaerythritol+ε-caprolactone | 8 | THF | 24-43 | 5 | | 40 | 4.0 | [10]1.4756 | 15 | 328.5 | 346.5 | 94.7 | 10.80 | 10.91 | $CH_2-C(-C-(CH_2)_5-O-)_n C-Cl$ <br> $C(CH_2-O-CH_2-C-[CH_2-O-(C-(CH_2)_5-O-)_n C-Cl]_3)_2$ |
| VIII | Dipentaerythritol+ε-caprolactone | 6 | THF | 24-45 | 6 | | 40 | 4.0 | [10]1.4747 | 12 | 310.5 | 336.0 | 92.3 | 11.42 | 12.02 | $CH_2-O-(-C-(CH_2)_5-O-)_n C-Cl$ <br> $CH_2-C-[CH_2-O-(C-(CH_2)_5-O-)_n C-Cl]_3$ <br> $-O-$ <br> $CH_2-C-[CH_2-O-(C-(CH_2)_5-O-)_n C-Cl]_3$ |
| IX | Trimethylolethane+propylene oxide | 3 | THF | 21-36 | 5 | | 35 | 4.3 | [5]1.4493 | 3 | 282.5 | 276.0 | 97.7 | 12.38 | 12.62 | $CH_3-C-[CH_2-O-(-CHCH_2O-)_n C-Cl]_3$ <br> $CH_3$ |
| X | Pyrogallol+propylene oxide | 3 | THF | 22-38 | 5 | | 32 | 4.3 | [5]1.4909 | >18 | 184.0 | 187.4 | 101.8 | 19.28 | 19.71 | $C_6H_3-[O-(CHCH_2O-)_n C-Cl]_3$ <br> $CH_3$ |
| XI | Pentaerythritol+propylene oxide | 4 | THF | 23-40 | 5 | | 32 | 3.0 | [5]1.4582 | 2.5 | 155.9 | 168.9 | 101.9 | 22.78 | 23.19 | $C-[CH_2-O-(CHCH_2O-)_n C-Cl]_4$ <br> $CH_3$ |
| XII | 1,2,6-hexanetriol+propylene oxide | 3 | THF | 23-40 | 5 | | 32 | 3.0 | [5]1.4538 | >18 | 220.5 | 210.5 | 95.6 | 16.1 | 16.21 | $CH_2-O-(CHCH_2O-)_n C-Cl$ <br> $CH_3$ <br> $CH-O-(CHCH_2O-)_n C-Cl$ <br> $CH_3$ <br> $(CH_2)_3$ <br> $CH_2-O-(CHCH_2O-)_n C-Cl$ |

[1] Gardner.
[2] Calculated from the hydroxyl equivalent.
[3] Analysis by modified Volhard method.
[4] Tetrahydrofuran.
[5] Free flowing.
[6] Reacted spontaneously at 42° C. Cooled with with ice.
[7] Viscous, but flows.
[8] Semi-solid.
[9] No hydroxyl equivalent given. Calc'd from M.W. figure.
[10] Very viscous, flows.

NOTE.—Infrared spectra are consistent with those of the desired products.

EXAMPLE XIII

Polyurethane derived from piperazine and a tris-chloroformate which was prepared from a trimethylolpropane-ethylene oxide adduct Piperazine (.11 eq.) and sodium carbonate (.20 mole) are dissolved in 200 mls. of ice cold water. The solution is stirred rapidly in a Waring Blendor and a solution of the trischloroformate (.10 eq.) of Example III in methylene chloride (100 mls.) is added rapidly. Reaction occurs immediately with a white solid forming. Additional water is added and the methylene chloride evaporated. The solid polymer is agitated in the Waring Blendor with additional water until the particles are finely divided. Filtration, repeated washing with warm water, and drying in a vacuum oven at 100° C. for 24 hours gives a white, solid polyurethane in high yield.

EXAMPLE XIV

Polycarbonate derived from bis(phenol A) and a hexachloroformate which was prepared from a sorbitol-ε-caprolactone adduct Bis(phenol A)(P,P′[2,2-propylidene]bisphenol) (0.10 eq.) and pyridine (.2 mole) are dissolved in 250 mls. of tetrahydrofuran and stirred rapidly in a Waring Blendor. A solution of the hexa-chloroformate (0.10 eq.) of Example V in 100 mls. of tetrahydrofuran is added rapidly to the bis(phenol A), pyridine solution. The solid polymeric carbonate which formed was collected on a funnel, washed several times with warm water in the Waring Blendor, and finally collected as a finely divided solid, which when dried in a vacuum oven gives a solid free of chlorine.

Although this invention has been illustrated by the preceding examples, it is not to be construed as limited to the materials employed therein, but rather, this invention encompasses the broad classes of multi-haloformates and monomeric and polymeric derivatives as hereinbefore disclosed. Various modifications and embodiments of this invention can be made without departing from the spirit and scope thereof.

What is claimed is:

1. A polyhaloformate of the formula:

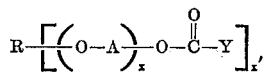

wherein

R = an aliphatic hydrocarbon radical containing 1 to 6 carbon atoms.
A = lower alkylene.
Y = F, Cl or Br.
$x'$ has a value of 3 to 6.
$x$ has a value of 1 to 5.

2. A hexachloroformate adduct of the formula:

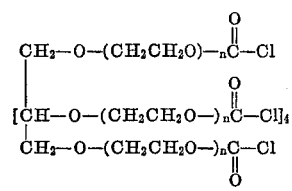

wherein $n$ has a value of from 1 to 5, inclusive.

3. A trichloroformate adduct of the formula:

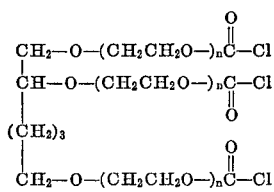

wherein $n$ has a value of from 1 to 5, inclusive.

4. A trichloroformate adduct of the formula:

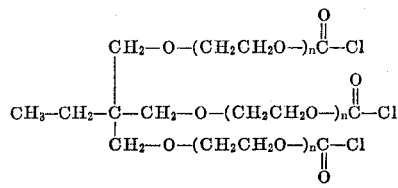

wherein $n$ has a value of from 1 to 5, inclusive.

5. A trichloroformate adduct of the formula:

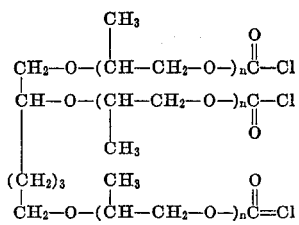

wherein $n$ has a value of from 1 to 5, inclusive.

6. A trichloroformate adduct of the formula:

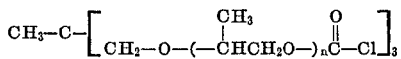

wherein $n$ has a value of from 1 to 5, inclusive.

7. A tetrachloroformate adduct of the formula:

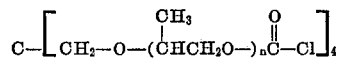

wherein $n$ has a value of from 1 to 5, inclusive.

References Cited

UNITED STATES PATENTS

| | | | |
|---|---|---|---|
| 2,866,757 | 12/1958 | Newman et al. | 260—463X |
| 3,366,708 | 1/1968 | Magnusson et al. | 260—463X |
| 2,384,123 | 9/1945 | Muskat et al. | 260—463X |
| 3,248,415 | 4/1966 | Stevens | 260—463 |
| 2,619,508 | 11/1952 | Mikeska et al. | 260—463X |

OTHER REFERENCES

P. Wright et al.: Solid Polyurethane Elastomers (Maclaren, 1969).

LEON ZITVER, Primary Examiner

L. DeCRESCENTE, Assistant Examiner

U.S. Cl. X.R.

260—47, 77.5, 348, 858